US012701062B1

(12) United States Patent
Postelnicu

(10) Patent No.: US 12,701,062 B1
(45) Date of Patent: Aug. 4, 2026

(54) DEVICES AND METHODS INVOLVING TIME SERIES SIGNAL ASSESSMENT

(71) Applicant: 8x8, Inc., Campbell, CA (US)

(72) Inventor: Corina Postelnicu, Bucharest (RO)

(73) Assignee: 8x8, Inc., Campbell, CA (US)

( * ) Notice: Subject to any disclaimer, the term of this patent is extended or adjusted under 35 U.S.C. 154(b) by 73 days.

(21) Appl. No.: 18/761,717

(22) Filed: Jul. 2, 2024

(51) Int. Cl.
| | |
|---|---|
| *G06F 15/173* | (2006.01) |
| *H04L 43/045* | (2022.01) |
| *H04L 43/067* | (2022.01) |
| *H04L 43/08* | (2022.01) |

(52) U.S. Cl.
CPC .......... *H04L 43/067* (2013.01); *H04L 43/045* (2013.01); *H04L 43/08* (2013.01)

(58) Field of Classification Search
CPC ...... H04L 43/067; H04L 43/045; H04L 43/08
See application file for complete search history.

(56) References Cited

U.S. PATENT DOCUMENTS

| | | | |
|---|---|---|---|
| 5,473,732 | A | 12/1995 | Chang |
| 6,424,935 | B1 | 7/2002 | Taylor |
| 7,236,932 | B1 | 6/2007 | Grajski |
| 8,788,535 | B2 | 7/2014 | Bonev et al. |
| 10,142,329 | B1 | 11/2018 | Liu |
| 10,224,059 | B2 | 3/2019 | Childress et al. |
| 10,318,617 | B2 | 6/2019 | Gelfand et al. |
| 10,735,592 | B1 | 8/2020 | Liu et al. |
| 10,939,179 | B2 | 3/2021 | Park et al. |
| 10,949,619 | B1 | 3/2021 | Arsanjani et al. |
| 10,994,800 | B2 | 5/2021 | Noguchi et al. |
| 11,025,488 | B1 | 6/2021 | Arsanjani et al. |
| 11,044,338 | B1 | 6/2021 | Arsanjani et al. |

| | | | |
|---|---|---|---|
| 11,070,640 | B1 | 7/2021 | Arsanjani et al. |
| 11,196,866 | B1 | 12/2021 | Samat et al. |
| 11,425,252 | B1 | 8/2022 | Martin et al. |
| 11,445,063 | B1 | 9/2022 | Driemeyer et al. |

(Continued)

FOREIGN PATENT DOCUMENTS

| | | |
|---|---|---|
| WO | 2022/240433 A1 | 11/2022 |
| WO | 2022/256028 A1 | 12/2022 |

OTHER PUBLICATIONS

TheSandWraith: How to merge iOS messages conversation feed? Apple Inc., https://discussions.apple.com/thread/6566339, 4 pages (Sep. 27, 2014).
Alex Heath. Merge Clears Up Confusion by Combining iMessages From Multiple Device IDs Right In iOS [JailbreakCon]. https://www.cultofmac.com/category/news/, 9 sheets (Sep. 29, 2012).
8x8, "8x8 Work", https://www.8x8.com/products, downloaded Jul. 2023.

(Continued)

*Primary Examiner* — Padma Mundur
(74) *Attorney, Agent, or Firm* — Vista IP Law Group, LLP

(57) ABSTRACT

Aspects of the present disclosure are directed to computer-implemented methods, apparatuses and systems involving the processing of time series signals for assessing trend characteristics related thereto. In a particular aspect, a time series of signals generated at respective endpoint devices participating in data communications in a data-communications system are monitored. Categorical variables indicative of a characteristic trend of the time series of signals are assessed, and for one or more of the endpoints that communicates the time series of signals, a subset of the time series of signals that effect a change in the characteristic trend of the signals is identified. An output characterizing the change and the subset of the time series of signals is generated and transmitted.

20 Claims, 12 Drawing Sheets

(56) References Cited

U.S. PATENT DOCUMENTS

| | | | | |
|---|---|---|---|---|
| 11,456,887 | B1 * | 9/2022 | McCracken | H04L 12/1822 |
| 11,539,541 | B1 | 12/2022 | Driemeyer et al. | |
| 11,551,005 | B1 | 1/2023 | Arsanjani et al. | |
| 11,575,755 | B1 | 2/2023 | Arsanjani et al. | |
| 11,575,791 | B1 | 2/2023 | Arsanjani et al. | |
| 11,622,043 | B1 | 4/2023 | Samat et al. | |
| 2003/0055974 | A1 | 3/2003 | Brophy et al. | |
| 2004/0143559 | A1 | 7/2004 | Ayala | |
| 2008/0086564 | A1 | 4/2008 | Putman et al. | |
| 2009/0112875 | A1 | 4/2009 | Maes | |
| 2009/0276215 | A1 | 11/2009 | Hager | |
| 2011/0046960 | A1 | 2/2011 | Spier et al. | |
| 2013/0063542 | A1 * | 3/2013 | Bhat | H04L 12/1822 |
| | | | | 348/E7.083 |
| 2014/0100848 | A1 | 4/2014 | Shaffer et al. | |
| 2016/0095056 | A1 | 3/2016 | Lebon-schneider et al. | |
| 2016/0227035 | A1 | 8/2016 | Kumar et al. | |
| 2017/0006161 | A9 | 1/2017 | Riahi et al. | |
| 2018/0268318 | A1 * | 9/2018 | Matam | G06N 7/01 |
| 2018/0315000 | A1 | 11/2018 | Kulkarni et al. | |
| 2024/0161027 | A1 * | 5/2024 | Silverstein | G06Q 10/06398 |

OTHER PUBLICATIONS

8x8 Admin Console, "Set up call park extension." 8x8, Inc. (2022), 1 sheet https://docs.8x8. com/8x8WebHelp/admin-console/Content/ Set_up_Call_Park_Extension.htm.

8x8, "8x8 Frontdesk", https://www.8x8.com/products/business-phone/frontdesk?locale=us&utm_medium=paid-search&utm_source= google&utm_campaign=elite&utm_adgroup=Google_US_Search_ Brand_Frontdesk|AAA_8x8_Frontdesk&utm_term=8x8%20front% 20desk&type=Google_US_Search_Brand_Frontdesk&gclid= Cj0KCQiA4b2MBhD2ARIsAIrcB-RkZXOwVjVgTkcRcA_ XSIAMzBFL5JJvV7M7xi9_fCrXSVOIZamU5OUaAii8EALw_ wcB, downloaded Apr. 25, 2023.

8x8, "8x8 Work", https://www.8x8.com/products, downloaded Apr. 25, 2023.

U.S. Appl. No. 18/678,212, filed May 30, 2024, and entitled: Systems and Methods Involving Contextual Data Insight Generation and Presentation Within Data-Communications Systems. Referred to the copending patent prosecution of the common Applicant. No Attachment.

* cited by examiner

DEVICES AND METHODS INVOLVING TIME SERIES SIGNAL ASSESSMENT

BACKGROUND

Aspects of the present disclosure are related generally to the field of data communications, as may be exemplified by uses in data-communications systems that operate for communicating various types of data as may relate to voice, text, imagery, documents, video, media and other data. In certain contexts, computer-based data communications systems often include circuitry, such as Internet-communication-enabled circuitry and user interface platforms that function to facilitate interaction between multiple endpoint devices (and as applicable to users at the endpoint devices).

Assessing interactions between endpoint devices can be challenging. For instance, voice, text, video and other data may be communicated from respective endpoint devices as part of a group or groups of communications. Signals including this data can thus originate from any endpoint device, and in certain instances, may influence or otherwise affect such data originating from other devices. There can be many such signals, and a myriad of interactions that may relate to one or more aspects of each signal. Assessing interactions in this regard, for example as may be attributable to a particular group, may require utilization of a multitude of such signals and related reactions.

These and other aspects present challenges to the implementation and operation of communications circuitry and systems.

SUMMARY OF VARIOUS ASPECTS AND EXAMPLES

Various examples/embodiments presented by the present disclosure are directed to issues such as those addressed above and/or others that may become apparent from the following disclosure. For example, some of these disclosed aspects are directed to systems, methods and devices that use or leverage from the analysis of an influence of certain communications upon other communications within a common group/collection of endpoint devices, and respective users at those devices. Other aspects are directed to overcoming previously-used techniques, such as discussed above, by integrating communications across disparate platforms (e.g., which may include active and/or historical communications) to assess characteristics of endpoint-initiated communications and their influence upon sentiment for a particular communication session.

Various aspects of the disclosure are directed to real time or near-real time quantification of the evolution of a relationship between a time series of signals generated by known independent sources that are clusterable (e.g., due to participation in a joint interaction or being part of a pre-defined group) and cluster-level trends. More detailed aspects are directed to assessing a "snowball" effect, in which certain communications initiate a change in trend (e.g., slope) involving escalation or de-escalation of communication sentiment for a communications session.

A more particular embodiment is directed to a computer-implemented method as follows. A time series of signals are monitored, in which the signals are generated at respective endpoint devices participating in data communications in a data-communications system. Categorical variables are assessed for the time series of signals, in which the categorical variables are indicative of a characteristic trend of the signals. For one or more of the endpoints that communicates the time series of signals, a subset of the time series of signals that effect a change in the characteristic trend of the signals is identified. An output characterizing the change and the subset of the time series of signals is generated and transmitted. In certain implementations, this approach involves monitoring communications in a teleconference, assessing the signals for user sentiment type (positive vs. negative) and identifying escalating and/or de-escalating changes for particular endpoints/users. The output may thus be generated to characterize changes involving escalating or deescalating.

Another embodiment is directed to an apparatus comprising server circuitry to provide data communications in a data-communications system involving hosted communications between a plurality of endpoints, and analytics circuitry to monitor a time series of signals generated at respective ones of the endpoints. The analytics circuitry is further configured to ascertain categorical variables for the time series of signals, in which the categorical variables being indicative of a characteristic trend of the signals. For one or more of the endpoints that communicates the time series of signals, the analytics circuitry is further configured to identify a subset of the time series of signals that effect a change in the characteristic trend of the signals, and to generate and transmit an output characterizing the change and the subset of the time series of signals.

Another embodiment is directed to a data communications system comprising server circuitry and analytics circuitry. The server circuitry is to host communication sessions for a plurality of users participating in the communication sessions via respective endpoint devices, including presenting (for each communication session) a user interface at each endpoint device participating in the communication session for conveying time series of communication signals from the endpoint device. The analytics circuitry is to monitor the time series of communication signals generated at respective ones of the endpoints, and ascertain categorical variables for the time series of communication signals in which the categorical variables being indicative of a characteristic trend in sentiment of the communication signals. For one or more of the endpoints, the analytics circuitry identifies a subset of the time series of communication signals from the one or more endpoints that effect a change in the characteristic trend of the communication signals from one or more of the other endpoints. The analytics circuitry further generates and transmits an output characterizing the change and the subset of the time series of signals, therein providing an indication of an effect of communications from one or more of the endpoints upon a trend in sentiment characteristics of the communication session.

The above discussion is not intended to describe each aspect, embodiment or implementation of the present disclosure. The figures and detailed description that follow exemplify various embodiments.

BRIEF DESCRIPTION OF FIGURES

Various example embodiments, including experimental examples, may be more completely understood in consideration of the following detailed description in connection with the accompanying drawings, each in accordance with the present disclosure, in which:

FIGS. 3A and 3B show an approach for assessing trending in data communications as influenced by signals from respective endpoints, according to certain exemplary aspects of the present disclosure, in which:

FIG. 3A shows the assessment of a time series of variables for ascertaining trends of aggregate metrics; and FIG. 3B shows processing of the ascertained trends from FIG. 3A;

Figure 1:
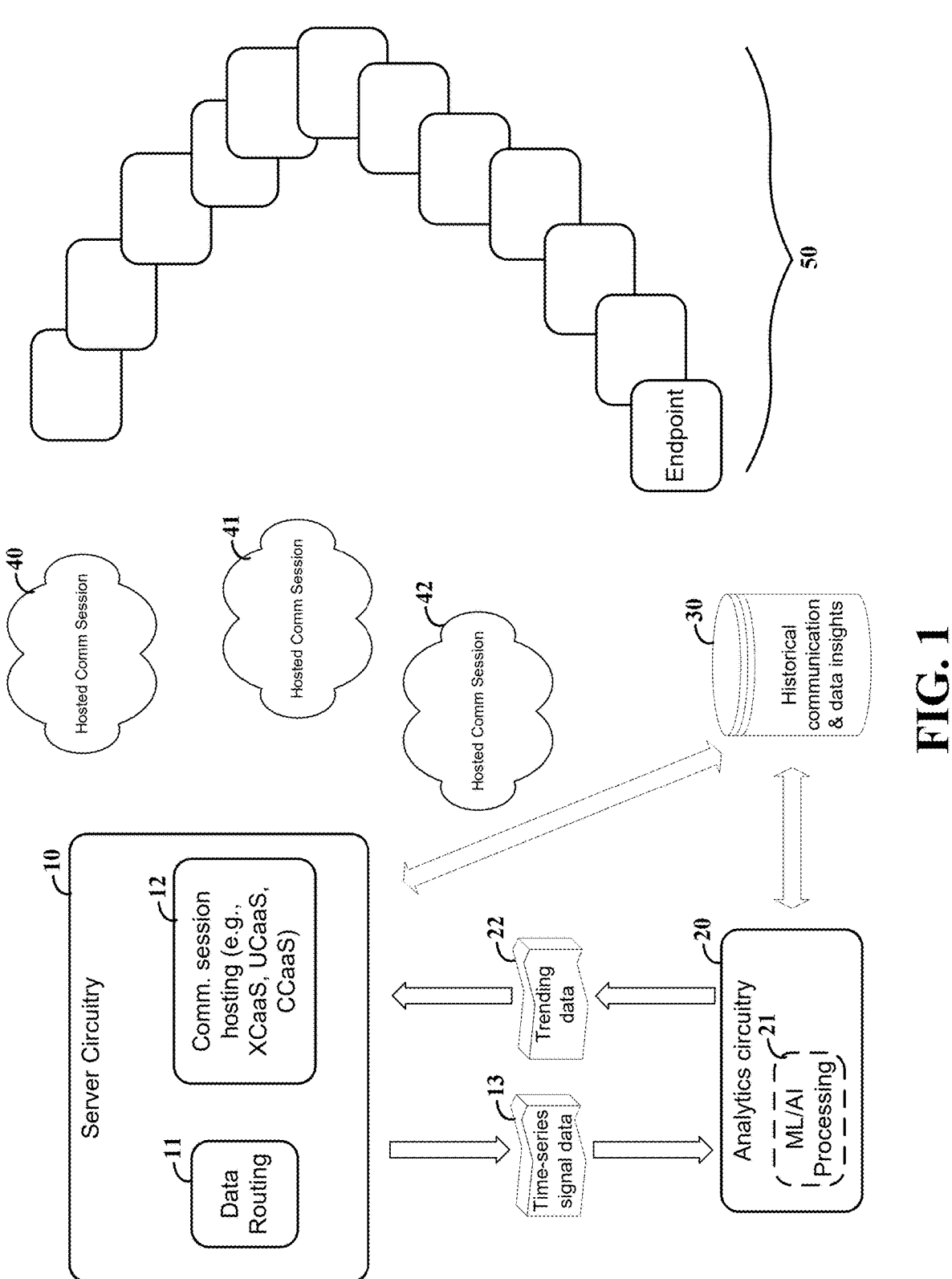
FIG. 1 shows a communications system, according to certain exemplary aspects of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving devices characterized at least in part by analyses involving multiple endpoints/participants in a communications system. Exemplary aspects of the present disclosure are related to analysis of location, direction, speed of change and weight of the relationships between time series signals generated by independent sources participating in a cluster/joint interaction, and an overall trend collected at a cluster/interaction-level. Certain aspects involve an algorithm for near-real time quantification of the evolution of the relationship between time series signals generated by known independent sources which are clusterable (for example, because of draw participation in a joint interaction or being part of a predefined group) and cluster-level trends. While the present disclosure is not necessarily limited to such aspects, an understanding of specific examples in the following description may be understood from discussion in such specific contexts.

More specific aspects are directed to the analysis of location, direction, speed of change and weight of the relationships between time series signals generated by independent sources participating in a cluster for joint interactions, and the overall trend collected at the cluster/interaction-level. Such an approach may be implemented to assess categorical time series signals individually collected from participants in a conference call, to identify the moments in the overall meeting timeline when incremental changes in (subsets of) participant-level trends (of positive|negative user sentiment proportion, relative to overall user sentiment) may start to impact/be impacted by the overall meeting-level trend (of meeting-level sentiment type proportion, relative to overall meeting sentiment).

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For case of illustration, the same connotation and/or reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

As noted above, certain exemplary aspects of the present disclosure involve methodology and structures directed to assessing trends in time series signals, as may be generated at respective endpoint devices. One or more of the signals that effect a high degree of change in such trends are identified, and an output characterizing the change is generated and transmitted (e.g., by presenting a graphical indication of the change for display).

Certain aspects involve identifying ones of the time series of signals that effect a rate of change in the characteristic trend of the signals, such as by identifying one or more of the endpoints that communicates ones of the subset of the time series of signals effecting the rate of change that exceeds a threshold. The output is generated and transmitted in response to the rate of change in the characteristic trend exceeding such a threshold, which is indicative of a high rate of change.

Various aspects of the disclosure are directed to methods, which may implement algorithms, for near-real time quantification of the evolution of a relationship between time series signals generated by known independent sources that are clusterable. An example such application involves endpoint/user participation in a joint interaction or as part of a predefined group, and cluster-level trends.

A more particular example involves the detection of a snowball effect in a meeting, such as where a communication from a particular endpoint/participant causes a shift in other endpoints/participants as may relate to tone of the meeting or other sentiment-type aspects. A participant, statement, reaction, or track effect (e.g., short-term timelines during a meeting or long-term timelines over several meetings) may be assessed in this regard. Reporting may be created, for instance on a macro organization level, or on a user-level, and may include insights, suggestions and/or predictions/estimations. Insights (or other type of content generated) including reports can be incorporated inline in apps, and services such as user interface services. Standalone reporting may be provide at the macro level or user level (e.g., feedback directly to a user such as the user that may have caused a snowball effect).

In accordance with the above and other implementations characterized herein, various embodiments may be utilized in connection with products and/or services provided by 8×8 Incorporated of Campbell, California. Such products/services may include one or more of 8×8 Work (e.g., version 8.13), 8×8 Frontdesk (e.g., version 8.13), and others. More generally, various embodiments characterized herein may be applicable for implementation with a variety of XCaaS (experience communications as a service), UCaaS (unified communications as a services, CCaaS (contact center as a services), and CPaaS (communications platform as a service) environments, products and services. For instance, certain embodiments are directed to providing meetings services. For such a meeting with multiple participants, algorithm(s) can be applied and analyzed to determine a point in a meeting that something is said or otherwise communicated that causes a shift in the meeting amongst participants. This approach may be applied individually in a meeting as well as more broadly across different communication channels, for instance in omni-channel communications that may integrate different ways users communicate, this approach can be applied to make determinations unique to platforms such as those referenced above and available from 8×8, Inc., and the vast data sources integrated.

For various approaches involving assessing insights as to communications and related contextual data, reference may be made to U.S. patent application Ser. No. 18/678,212, entitled "Systems and Methods Involving Contextual Data Insight Generation and Presentation Within Data-Communications Systems," to 8×8 Inc, which is fully incorporated herein by reference. For example, various contextual data insights as collected therein, across one or more communications environments, may be utilized in connection with assessing changes in sentiment such as those relating to a "snowball" effect as characterized herein.

In further instances, one or more ML/AI (machine learning/artificial intelligence) algorithms can leverage data across different communication channels to provide richer context for generating determinations (e.g., snowball effect), including increased accuracy in predictions and contextual insights around determinations as to why the prediction is (or is not) accurate. This data may be leveraged to generate real-time (or near real-time) insights, reporting (timelines macro/micro-levels) around a snowball effect, suggestions on action items to address such as contextually relevant suggestions that may relate to 8×8 platform-specific functions, to leverage omni-channel capabilities to resolve, such as send email, message, hold follow-up meeting, etc.

Approaches may be omni-channel in the sense that 1) the characterized approaches can apply to various communication modalities (in addition to meetings); and 2) data across different communication modalities can be leveraged to improve analytics. Omni-channel aspects are also useful to provide richer context around snowball points. For example, where a chat room message exchange occurred prior to a meeting that may have set the table for a meeting to be positive or negative, such an exchange can be analyzed for identifying changes in sentiment during the meeting or for the meeting as relative to other meetings. In another example, an email thread may be analyzed to detect a specific email (or a specific statement or other communication provided in an email) that initiates a snowball effect.

As a particular use case scenario, aspects of the present disclosure are directed to analyzing the evolution of the relationship between trends of user-level sentiment type proportion (as % of total user sentiment in a meeting) and meeting-level sentiment type proportion (as % of total meeting sentiment). Inputs may include a time series of categorical variables (e.g. user sentiment type, positive vs negative), generated by independent sources (e.g. the participants in a conference call). A clustering mechanism of the studied signal sources, uniquely identifiable via an ID (e.g. a joint interaction—such as a conference call or a social media stream; a group, such as a unique customerID), is used to cluster relevant communications. Outputs may include the time series segments (e.g. the conference call sections) exhibiting escalating/de-escalating change in the evolution of the monitored trend relationships (where individual signals might start to increasingly/decreasingly affect/be affected by the overall interaction-level trend). Other outputs may include subsets of signal-generating sources (e.g. meeting participants) most likely to be driving/driven by the overall interaction-level trend, and the direction (escalating/de-escalating), speed of change and weight of the evolution of possible relationships between the user-level and the meeting-level trends Various assumptions may be made in such an assessment. These may include:

Input sources are independent;

Input sources are identifiable via a unique ID (e.g. participantID in a conference call|social media stream);

Input data is/may be transformed into categorical data;

The clustering mechanism (interaction|group) may be identified via an ID (e.g. meetingID in a conference call, channelID in a social media stream).

The association between the input trends and the cluster-level trend is linear.

Each point of interest is monitored via a timestamp-event-event attribute

Processing steps may include trend preprocessing, for windows of continuously increasing size, from timeline start onwards by calculating user-level trend evolution for each participant, user-level sentiment type (as a proportion of overall user sentiment), and interaction-level trend evolution as may relate to meeting-level sentiment type, as a proportion of overall meeting sentiment, for all users. For each user-level trend, the relationship with the higher-level trend can be assessed, such as by calculating a correlation between the user-level trend and the interaction-level trend, filtering correlation trend values that are positive (therefore indicative of users directly affecting/affected by the interaction-level trend) for focusing on these trends. A correlation trend slope (i.e. the speed of change) may be calculated via the finite difference method. Positive| Negative slope segments can be identified as being indicative of out of sync relationships between the user and the interaction-level trend-therefore of a situation's potential to escalate|de-escalate, because of increasing/decreasing activity at user-level affecting the overall activity at meeting-level, and/or vice-versa. Zero slope segments (approx. constant correlation trend) are indicative of in-sync user-meeting relationships (user-level trend matching/mimicking, for some time, the meeting-level trend). The sum of all slope segments (both positive and negative) may be calculated and the sign of the sum of all slope segments can be extracted.

The correlation trend slope summation may be translated into a time series of values in $\{-1, 0, 1\}$. The locations of the transitions between the sign values may be assessed as follows $+1 \rightarrow \{-1, 0\}$ transitions mark the start of incipient de-escalation $\{-1, 0\} \rightarrow 1$ transitions mark the start of incipient escalation The weights of the correlation trends participating in the summation may then be calculated: Norm user-level correlation trend values against the summation of all in-segment correlation values.

Certain specific embodiments are directed to the analysis of 1-to-N participants in an interaction such as a recording. Escalation is detected as the result of a subset of (computable) participants significantly affected by and/or affecting an overall trend in the interaction. The location, speed, weights and participants in an escalating/de-escalating pattern are calculated. Further, the start/end of segments of interest based on whether a subset of users is increasingly/decreasingly affecting/affected by the overall trend is calculated. The start/end of segments of interest is calculated based on whether a subset of users is increasingly/decreasingly affecting/affected by the overall trend. Both participant-level trends and overall trends, and the relationship between them (not only in overall trend), may be assessed. Weights of participants to an interaction may be automatically calculated.

For instance three aspects (or features) that would provide the advantage and that would not be already provided by such other solutions may be identified as follows:

Aspect i) Time domain method, may not rely on signal decomposition techniques (such as frequency, time-frequency or subspace control methods) to estimate the contribution of each signal to the overall relationship Aspect ii) One-stop solution to provide information about source(s), location(s) in the timeline, amount and speed of change in trend relationship evolution Aspect iii) Leveraging ML/AI and 8×8 platform (as referenced above) data to generate contextually relevant, insights, reporting, suggestions, etc., related to snowball effect determinations including those that are contextually relevant for the omnichannel experience in the 8×8 platform. A foundational basis may be created to build contextually relevant data (e.g., a data endpoint to springboard and expand 8×8's usability, UX, and customer experience).

Other embodiments are directed to the analyses of time series from user-generated time series in a group of users (if a feasible timeline of relevant high-level metrics may be collected|calculated at group level), user-generated streams in a common social media channel, and user activity|actions, in relation to overall health metrics.

Certain implementations are applicable to near-real time quantification of incipient similarity in evolution of metric values computed for time series signals generated by independent sources, affecting/affected by an overall higher-level trend (calculated at interaction-level or at group-level, for all sources involved). For instance, such an approach may be applicable to signals of any type where the following prerequisites hold:

Input sources are known

Input sources are independent

Input sources are identifiable via a unique ID (e.g. participantID in a conference call|social media stream), Input data is/may be transformed into categorical data The clustering mechanism (interaction|group) is identifiable via an ID (e.g. meetingID in a conference call, channelID in a social media stream).

The association between the input trends and the cluster-level trend is linear.

Each point of interest is monitored via a timestamp—event—event attribute

Consistent with the embodiments characterized herein, aspects of the present disclosure may be implemented to provide exemplary technical advantages, such as may be utilized to solve technical problems relating to providing or provided data communications, providing real-time analysis of communications across various disparate platforms, and/or to integrating monitored data communications across disparate platforms for utilization in analyzing real time communications and generating outputs characterizing trends (active and reactive), for example as may relate to endpoint-initiated communication signals. Such exemplary technical advantages may be provided by carrying out operations as described in the present disclosure and may include (but are not limited to): feature functionality providing an indication of trends (as may relate to high slopes pertaining changes in transmitted signals) applicable to a particular cluster (e.g., a meeting group) and/or across multiple clusters that may involve one or more communication platforms. Further advantages pertain to the ability to integrate a communication platform's big data (e.g., as aggregated by monitoring data communications provided to users via the platform's server(s)) into any point of the analysis; to provide historical data for assessing endpoint/user influence upon snowball effects, as may include the production of contextual data that only the platform can produce; the ability to provide an agent or a related administrator with a user interface to provide an indication of one or more endpoints/users causing a snowball effect. Other aspects relate to an ability to use omni-channel capabilities of a data communications platform to improve processing efficiency, generation of improved contextually relevant data insights pertaining to trending, reduction in latency, extensibility, control/security over third-party integrations; adapted and/or improved GUI features and operation with customizable workspaces; increasing security when using and/or integrating third-party apps/services into the communications platform; and targeting relevant data/parameters that vendors can leverage to assess sentiment and other aspects of communications across disparate platforms. Various such aspects may be implemented utilizing the context of one or more of FIGS. 4-10 as described herein (alone or in combination), as practical applications that may pertain to assessing snowball type effects relating to such endpoint-related communications.

Other aspects are directed to overcoming previously-used techniques, such as discussed above, by analyzing communications over time, storing data characterizing the communications (and, e.g., solutions to technical problems addressed via the communications), and utilizing the stored data for assessing new communications to provide an indication of escalation/de-escalation. Furthermore, technical instructions and/or solutions may be provided to address and solve issues as may relate to escalation or de-escalation, for instance via transmission of an indicative output to a supervisory user or meeting chairperson, or directly to a user at an endpoint deemed as causing an escalation/de-escalation.

Furthermore, aspects of the present disclosure are directed to systems and methods that implement trained AI processing to further contemplate other types of signal data that may be collected through various host applications/services (e.g., pertaining to a software platform). For instance, application of trained AI processing (e.g., one or more trained machine learning models may be adapted to evaluate not only data and data sources integrating with an exemplary UX for assessing and serving operational opportunities, but other types of contextual data including past and/or current user actions, user preferences, application/service log data, etc., that are each associated with one or more users, entities, systems and/or endpoint devices. This additional signal data analysis may help yield determinations as to how (and/or when, or to whom) to provide an output indicative of trending aspects of communication clusters.

Non-limiting examples of signal data that may be collected and analyzed includes but is not limited to: device-specific signal data collected from operation of one or more user computing devices; user-specific signal data collected from specific tenants/user-accounts with respect to access to any of: devices, login to a distributed software platform, applications, services, etc.; application-specific data collected from usage of applications/services and associated endpoints (including third-party endpoints integrated within a software platform), data collected from disparate software platforms that provide disparate types of operational opportunities; or a combination thereof. Such aspects may be collected in the context of clustered communications, such as those pertaining to a particular meeting, or to a particular user's participation in disparate meetings. Analysis of such types of signal data in an aggregate manner may be useful in helping generate an indication of escalation/de-escalation, contextually relevant determinations, data insights, etc. Analysis of exemplary signal data may comprise identifying correlations and relationships between different types of signal data specific to user usage of one or more software data platforms (e.g., communications software platforms), where telemetric analysis may be applied to generate determinations with respect to a contextual state of user activity pertaining to escalation/de-escalation with respect to different host application/services and associated endpoints. Analyzing of signal data, including user-specific signal data, may occur in compliance with user privacy regulations and policies.

In some examples, one or more components characterized herein (and shown in the figures) are configured to manage application of one or more AI models to enhance processing described in the present disclosure. Trained AI processing is applicable to aid any type of determinative or predictive processing including specific processing operations described with respect to determinations, classification ranking/scoring and relevance ranking/scoring. An exemplary component for implementation trained AI processing may manage AI modeling including the creation, training, application, and updating of AI modeling. Trained AI processing may be adapted to execute specific determinations described herein including those for analyzing specific data and data sources of a software data platform (e.g., a communications software platform) and/or generating insights for data augmentation. For instance, an AI model may be specifically trained and adapted for execution of processing operations pertaining to analyzing features and functionality of an XCaaS offering including those non-limiting examples previously described. Non-limiting examples of AI implementation including but are not limited to: analyzing data (and metadata) associated with one or more software platforms including third-party integrations; generating contextual determinations for improving user experience, access to opportunities across disparate platforms (and for example rating or ranking such opportunities), performance, efficiency including contextual determinations for improving account access with respect to servicing opportunities, suggesting utilization of certain opportunities, and/or integrations including third-party integrations to enhance access; prioritization of opportunities, actions, etc. to improve workflow and processing. Exemplary AI processing may be applicable to aid any type of determinative or predictive processing by any components of the present disclosure, via any of: learning for curating displays, learning for prioritizing opportunities, and learning for manners in which to assess and/or present respective opportunities, among other examples. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed to execute processing described herein. In alternative examples, the present disclosure extends to integrating third-party AI modeling and further adapting and customizing said AI modeling to work with specific data and data sources of an exemplary software platform. For example, a third-party AI model may be adapted to work with a communications software platform including data, data sources, and integrations (e.g., APIs, web hooks, etc.) related to XCaaS features and functionality. In examples where a plurality of independently trained and managed AI models is implemented, downstream processing efficiency may be improved by an ordered application of trained AI models where processing results from earlier applied AI models can be propagated to subsequently applied AI models. For example, a trained AI model may evaluate opportunities and derive data correlations to improve processing and efficiency including suggestions for reallocation of resources and/or prioritizing of opportunities, which may then be utilized to suggest a re-prioritization of opportunities (and/or reallocation of resources as may be appropriate) to improve efficiency and quality of services provided.

Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting examples of semi-supervised learning that may be applied comprise but are not limited to: assumption determination processing; generative modeling; low-density separation processing and graph-based method processing, among other examples. Non-limiting examples of reinforcement learning that may be applied comprise but are not limited to: value-based processing; policy-based processing; and model-based processing, among other examples. Furthermore, a component for implementation of trained AI processing may be configured to apply a ranker to generate relevance scoring to assist with any processing determinations with respect to any relevance analysis, such as that described herein. Scoring for relevance (or importance) ranking may be based on individual relevance scoring metrics described herein or an aggregation of said scoring metrics. In some examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

A more particular embodiment is directed to a computer-implemented method as follows. A time series of signals are monitored, including monitoring signals generated at respective endpoint devices participating in data communications in a data-communications system. This approach may include, for example, monitoring communications in a teleconference or videoconference, in which the communications may include one or more of voice, text and document-type communication. Categorical variables indicative of a characteristic trend of the signals are assessed for the time series of signals (e.g., to assess user sentiment type, positive, negative or neutral). A subset of the time series of signals that effects a change in the characteristic trend of the signals is identified for one or more of the endpoints that communicates the time series of signals. Such a trend may relate to escalating and/or de-escalating changes for particular endpoints/users, such as by escalating or de-escalating a heated topic. An output (e.g., a graphical indication for display on one or more of the respective endpoints) characterizing the change and the subset of the time series of signals is generated and transmitted, for example to indicate changes involving escalating or deescalating.

In a more particular implementation, the data-communications system includes server circuitry to provide the data communications to include videoconference communications in which the time series of signals include signals generated by participants in the videoconference. The output involves generating and displaying a graphical output that visually characterizes the change, therein indicating a subset of one or more users at one of the respective endpoints that affect the change in the characteristic trend. For instance, the graphical output may be displayed on one of the endpoint devices utilized by a mediator and configured to control communication of the time series of signals to respective ones of the endpoint devices.

In another particular implementation, the monitored signals include signals from the endpoints involving different communication channels within a communication platform providing disparate types of communications via the different communication channels. Ones of the time series of signals communicated in different ones of the communication channels are identified and an output indicative of a rate of change in the characteristic trend in two or more of the communication channels is displayed. Such an approach may draw from "big data" in the context of drawing from multiple platforms (and may involve disparate communication channels). For instance, such an approach may utilize data from the 8×8 Work platform noted herein, characterizing communication channels as different platforms within a hosted system.

The subset of the time series of signals may be identified in one or more of a variety of manners. In certain implementations, ones of the time series of signals that effect a rate of change in the characteristic trend of the signals are identified. The output is generated and transmitted in response to the rate of change in the characteristic trend exceeding a threshold indicative of a high rate of change. The output may include, for example, information identifying one or more of the endpoints that communicates ones of the subset of the time series of signals effecting the rate of change that exceeds the threshold.

In another approach, the subset of the time series of signals is identified by identifying one or more of the endpoints that generates communications, or is responsive to communications, exhibiting a greater change in sentiment relative to changes in sentiment exhibited by the other ones of the endpoints. Certain implementations involve identifying ones of a time series of signals from a meeting in which the time series of signals is communicated, which effect a change in characteristic trends involving one or more of user-level sentiment as a proportion of total user sentiment in the meeting, meeting-level sentiment as a proportion of total meeting sentiment, and a combination thereof. In a further implementation, the subset of the time series of signals may be grouped from a plurality of the time series of signals corresponding to a common communications event involving the one or more of the endpoints. Such an approach may involve clustering one or more endpoints based on identifying information characterizing a group.

Another embodiment involves identifying segments of the signals exhibiting slopes indicative of out of sync relationships between a user at one of the endpoints, transforming a summation of the slopes into a time series of values, and identifying locations of transitions between the sign of the time series of values. Such transitions are indicative of a change in the slopes. The output may then be generated based on the identified locations of transitions.

The output may be generated in a variety of manners. In a particular implementation, the identified signals are weighted for ones of the endpoint devices exhibiting changes in the categorical variables. The rate of change in the characteristic trend of respective ones of the endpoints is assessed based on the weighting applied to signals communicated with the endpoints. Such a weighting mechanism may provide insight as to how important something is as to whether it is something to look into (e.g., whether a trend and/or particular user should be analyzed further). In such instances, the categorical variables may be based on an effect in the rate of change caused by the categorical variables.

In a particular implementation, a future change in the characteristic trend of the signals is predicted based on current changes in the characteristic trend of the signals and corresponding contextual data insights exhibited by the identified subset. The output may be generated based on the predicted change.

Another embodiment is directed to an apparatus including server circuitry that provides data communications in a data-communications system involving hosted communications between a plurality of endpoints, and analytics circuitry that monitors a time series of signals generated at respective ones of the endpoints. The analytics circuitry ascertains categorical variables for the time series of signals, in which the categorical variables are indicative of a characteristic trend of the signals. For one or more of the endpoints that communicates the time series of signals, the analytics circuitry identifies a subset of the time series of signals that effects a change in the characteristic trend of the signals. The analytics circuitry further generates and transmits an output characterizing the change and the subset of the time series of signals. Such aspects may be implemented, for example, using server circuitry and analytics circuitry as characterized in the context of FIGS. 1 and/or 11 as described below.

In a more particular implementation, the aforementioned data communications include videoconference communications in which the time series of signals include signals generated by participants in the videoconference as hosted by the server circuitry. The analytics circuitry generates a graphical output that visually characterizes the change in the characteristic trend of the signals, therein indicating a subset of one or more users at one of the respective endpoints that affect the change in the characteristic trend.

The analytics circuitry may be implemented in a variety of manners. In a particular implementation, the analytics circuitry identifies ones of the time series of signals that effect a rate of change in the characteristic trend of the signals, and generates and transmits the output in response to the rate of change in the characteristic trend exceeding a threshold indicative of a high rate of change. In another implementation, the analytics circuitry identifies one or more of the endpoints that generates communications exhibiting a greater change in sentiment, relative to changes in sentiment exhibited by the other ones of the endpoints.

Another embodiment is directed to a data communications system including server circuitry that hosts communication sessions for a plurality of users participating in communication sessions via respective endpoint devices, and analytics circuitry that monitors a time series of communication signals generated at respective ones of the endpoints. For each communication session, the server circuitry presents a user interface at each endpoint device participating in the communication session, for conveying the time series of communication signals from the endpoint device. The analytics circuitry ascertains categorical variables for the time series of communication signals, in which the categorical variables are indicative of a characteristic trend in sentiment of the communication signals. For one or more of the endpoints, the analytics circuitry identifies a subset of the time series of communication signals from the one or more endpoints that effect a change in the characteristic trend of the communication signals from one or more of the other endpoints. The analytics circuitry further generates and transmits an output characterizing the change and the subset of the time series of signals, therein providing an indication of an effect of communications from one or more of the endpoints upon a trend in sentiment characteristics of the communication session.

In a more particular implementation, the analytics circuitry identifies the subset of the time series of communication signals by identifying ones of the time series of signals that effect an increased rate of change in the characteristic trend in sentiment of the signals. The output is generated and transmitted based on the increased rate of change having a higher rate relative to a rate of change corresponding to earlier communications in the time series of communication signals, the output identifying one or more of the endpoints that causes escalating or deescalating sentiment in the communication session.

It is recognized and appreciated that as specific examples, the above-characterized figures and discussion are provided to help illustrate certain aspects (and advantages in some instances) which may be used in the manufacture of such structures and devices. These structures and devices include the exemplary structures and devices described in connection with each of the figures as well as other devices, as each such described embodiment has one or more related aspects that may be modified and/or combined with the other such devices and examples as described hereinabove.

Before turning to the drawings to be discussed in detail below, it is noted that each of the above (briefly-described) examples are presented in part to illustrate aspects of the present disclosure, as might be recognized by the foregoing discussion. As further examples, such aspects may utilize (or be utilized by) aspects depicted in one or more of the figures.

Furthermore, such aspects depicted in each figure may be implemented separately (e.g., disparate circuits/apparatuses may be implemented separately), and/or the aspects in disparate figures may be combined and utilized in connection with other figures, or for example with one or more of the figures and related description in U.S. patent application Ser. No. 18/678,212 as referenced above.

FIG. 1 shows a communications system, according to certain exemplary aspects of the present disclosure. The system includes server circuitry 10, analytics circuitry 20, and data storage circuitry 30. The server circuitry 10 operates to host communication sessions for groups/clusters of users, with communication sessions 40, 41 and 42 shown by way of example. The users may access the communication sessions via endpoint devices 50. The sessions may be specific in time, or may perpetuate such as in the context of historical email communications involving an end user.

The server circuitry may include a data routing circuit module 11, and a communication session hosting module 12. The data routing module facilitates the routing of voice, text, image, document or other data with the endpoints 50. The communication session hosting module 12 provides each hosted communication session (e.g., 40-42), such as by hosting a meeting in which several participants access the hosted communication session via respective ones of the endpoint devices.

The analytics circuitry 20 is in communication with the server circuitry 10 (or in some instance, included with the server circuitry), for receiving time-series signal data 13 as characterized herein. Such data may pertain to communications during a hosted communication session as noted above. The analytics circuitry processes the time-series signal data for identifying trends in the communications, and provides an output 22 characterizing the trends. For instance, a change or slope of time-series signals affected by one or more users generating time-series signals may be assessed and used to provide details concerning trends (e.g., escalation/de-escalation) as an output, which may be provided to a meeting host or, for example, to one or more users at the respective endpoints. The analytics circuitry 20 may thus operate to assess trends in accordance with one or more approaches characterized within this disclosure. Such aspects may involve analyzing and characterizing location, direction, speed of change and weight of the relationships between time series signals generated by the endpoints, and the overall trend collected at the cluster/interaction-level. For meeting applications, such approaches may involve identifying communications in a meeting timeline that cause changes in (subsets of) participant-level trends.

In various implementations, the analytics circuitry 20 includes an ML/AI processing circuit block 21. This processing block may utilize ML/AI operations as characterized herein, to assess the trends as noted above. For instance, as trends are assessed over time for disparate hosted communications sessions, historical data may be stored in the data storage circuitry 30 and used to correlate certain types of communications, slopes, direction and other characteristics to trends. This learned information can be utilized to better predict trends in real-time (or near real-time) communications.

Figure 2:
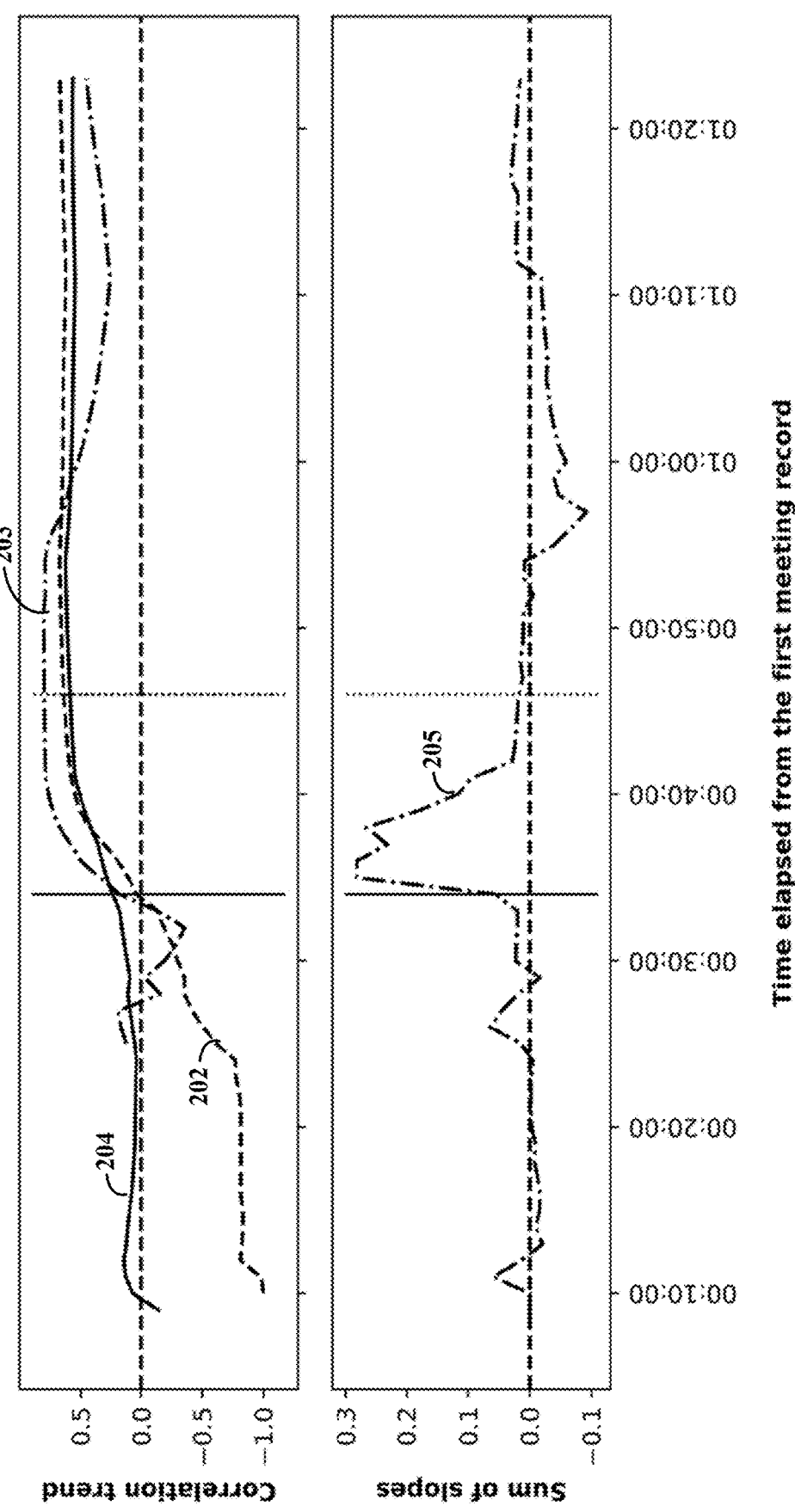
FIG. 2 is a plot showing correlation trend for respective users/endpoints, and a corresponding plot showing a sum of slopes of the plot lines, according to certain exemplary aspects of the present disclosure.

FIG. 2 shows a plot showing correlation trend for respective users/endpoints, and a corresponding plot showing a sum of slopes of the plot lines, according to certain exemplary aspects of the present disclosure. Correlation values are shown on the Y-axis, and elapsed time (in hours, minutes, and seconds) is shown on the X-axis. Each of lines 202, 203 and 204 respectively correspond to different users simultaneously impacted by and/or impacting the overall meeting "mood," and depict correlation values over time for time-series communications involving the particular user (e.g., as communicated via an endpoint as described with FIG. 1). The plot depicts a correlation trend between a proportion of user-level positivity (as a percentage of total sentiment for each user) and overall meeting-level positivity (as a percentage of total sentiment for all participants). Referring to the 20-30-minute window, the user represented by plot 202 initially exhibits a strong negative correlation value and users represented by plots 203 and 204 respectively exhibit nearly zero or a mild negative correlation value. The sentiment/mood of the meeting improves over time, with the user represented by plot 202 generally increasing in correlation value and the users 203 and 204 exhibiting positive correlation values (e.g., after the 34-minute mark).

Plot 205 depicts the sum of the slopes of the plots corresponding to each user. The sum of the slopes is relatively consistent until near the 34-minute mark, with a sharp increase thereafter followed by a period at relatively consistent slope. This depicts relatively consistent sentiment prior to the 34-minute mark (and a generally negative overall sentiment), a sharp increase in sentiment at about the 34-minute mark and continued increasing sentiment until about the 42-minute mark, after which another relatively consistent sentiment period (positive) continues with the sum of slopes again near zero.

These trends can be assessed relative to time-series communications at times corresponding to the indicated correlation values. For instance, communications near the 10-minute mark may be attributed to negative sentiment/mood, with communications between the shown window (vertical lines) beginning around the 34-minute mark being attributed to a rapid change in sentiment/mood, in which the plots exhibit a very positive slope relative to the plots during other time periods of the meeting. Such communications can be assessed for their impact on the sentiment/mood of the meeting. Further, learning algorithms can be utilized with data corresponding to communications during the positive slope to identify types of communications that facilitate the increasing correlation value. Such aspect may be utilized to provide insights, recommendations or other meeting-related details in the current and/or future meetings. Furthermore, such aspects may be utilized across disparate communication platforms such as those noted above (e.g., available from 8×8, Inc.).

Figure 3A:
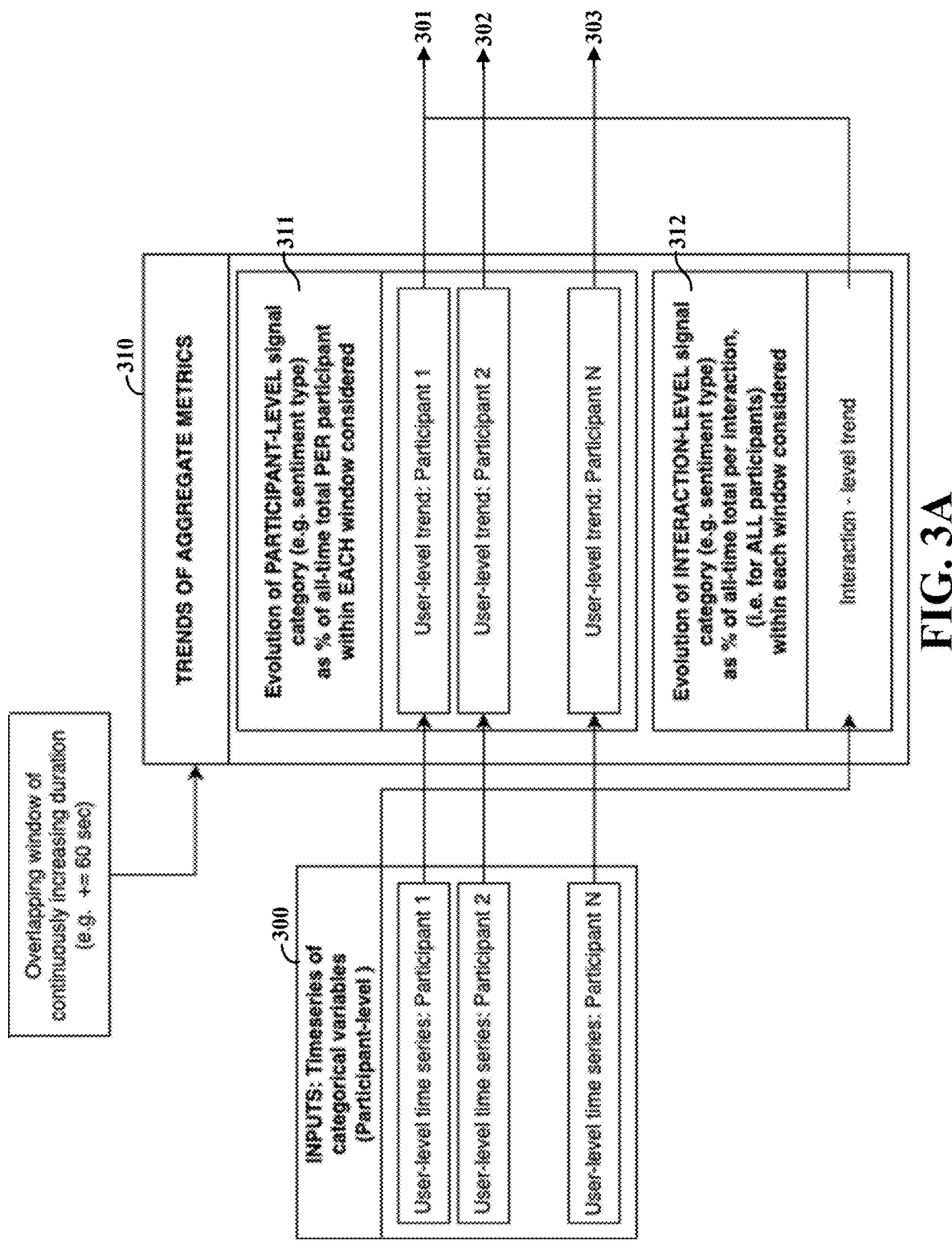
Figure 3B:
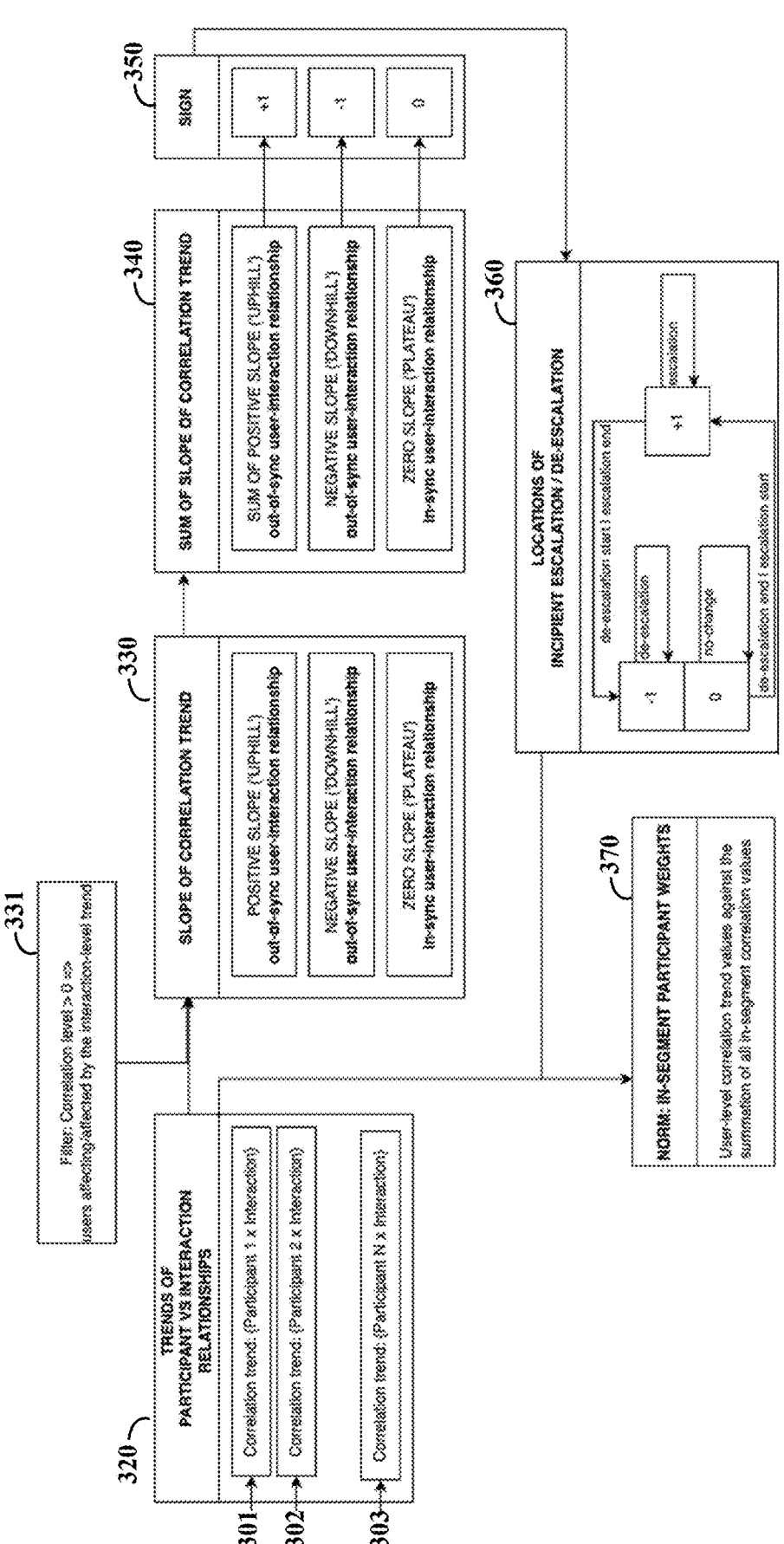

FIGS. 3A and 3B show an approach for assessing trending in data communications as influenced by signals from respective endpoints, according to certain exemplary aspects of the present disclosure. Referring to FIG. 3A, a time series of variables for ascertaining trends of aggregate metrics are assessed. Block 300 depicts inputs including a time series of categorical variables for N participants (at the participant level). At block 310, trends of aggregate metrics are assessed using the inputs from block 300, for an overlapping window of continuously increasing duration (e.g., +=60 seconds, as represented). More specifically, the evolution of participant-level signal category (e.g., sentiment type) is generated at block 311, as a percentage of all-time total per participant within each window being considered. This is carried out for each participant. At block 312, the evolution of interaction-level signal categories (e.g., sentiment type) is calculated as a percentage of all-time total per interaction for all participants within each window being considered. Blocks 311 and 312 may thus respectively provide user-level metrics applicable to sentiment of each user, and meeting-level metrics as applicable to all users 1-N in a particular meeting. These evolutions are processed to provide, for each user, outputs characterizing the user-level trend relative to the interaction-level trend, depicted as outputs 301, 302 and 303 for users 1, 2 and N (with additional such outputs for all users to the total number of N users).

FIG. 3B shows processing of the ascertained trends from FIG. 3A, with outputs 301, 302 and 303 as inputs to block 320 at which correlation trends of participant vs interaction relationships are assessed for each participant. This information is provided to block 330 for assessing the slope of the correlation trend, as may be utilized to assess escalation/de-escalation of sentiment, mood and other aspects of a particular meeting. A filter 331 may be applied as shown such that the slope pertains to a correlation level greater than zero for users affecting or being affected by the interaction-level trend. In this context (and consistent with aspects of the disclosure discussed above), slopes may be categorized as a positive (uphill) slope or negative (downhill) slope, respectively indicating out-of-sync user-interaction relationships, or as a zero (about) slope that indicates an in-sync user-interaction relationship. For instance, uphill slopes may be indicative of a trend characterized by an increase in sentiment, negative slopes may be indicative of a decrease in sentiment, with zero slopes representative of a state in which sentiment is consistent (be that positive, negative, or neutral). Such aspects may relate, for example, to respective time windows in the plots depicted in FIG. 2.

The slope information generated at block 330 is further processed at block 340 to assess the sum of the slope of the correlation trend for each respective slope condition (positive, negative, and zero), with an output 350 for each being characterized respectively as +1, −1 and 0 in sign. This information is further processed at block 360, along with the correlation trend outputs of block 320, to identify locations of incipient escalation and/or de-escalation. More specifically, the location of the start and end of respective escalation, de-escalation, or plateau/zero slope trends (in time) are identified. Consistent with embodiments herein, such aspects may be utilized to identify the onset (or shortly after onset) of issues causing a desirable or undesirable sentiment or mood condition. In certain implementations, in-segment participant weights may be assessed at block 370 to provide an indication (weighted) of user-level correlation trend values relative to the summation of all in-segment correlation values.

Figure 4:
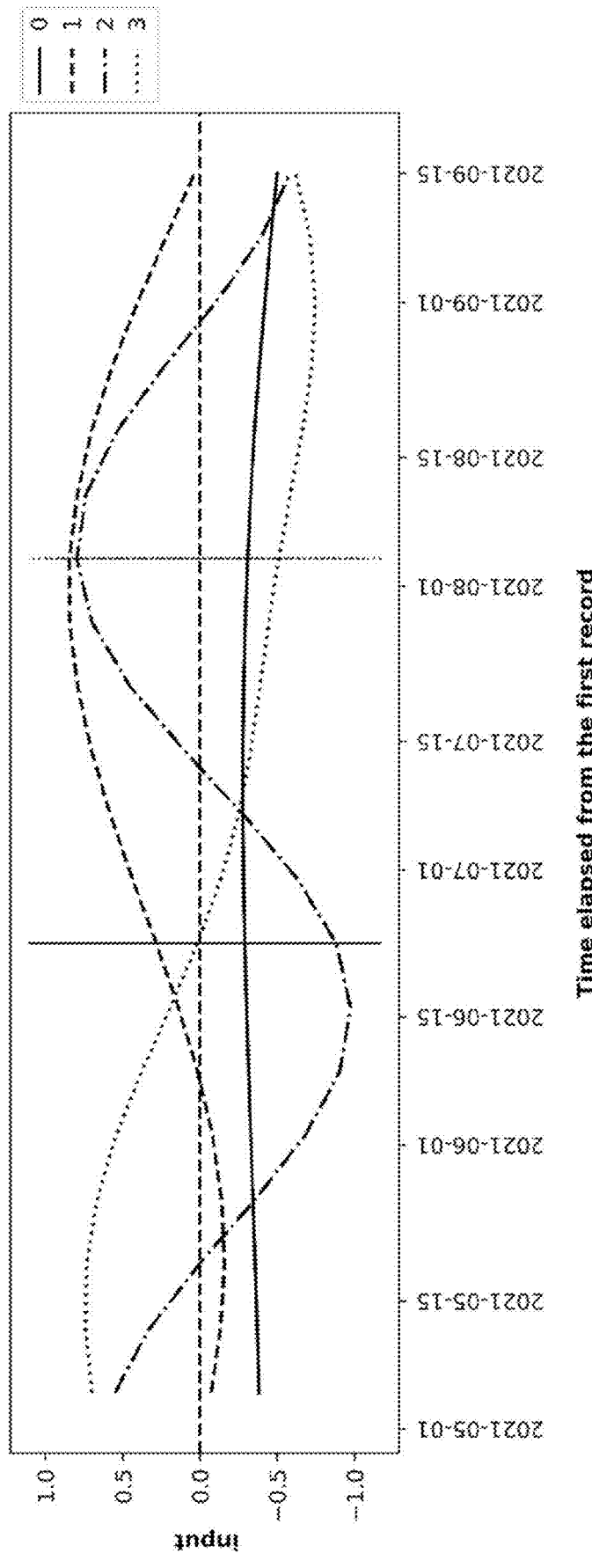
FIG. 4 shows a plot depicting uphill joint escalation trend assessment, as may be implemented in accordance with one or more embodiments.
Figure 5:
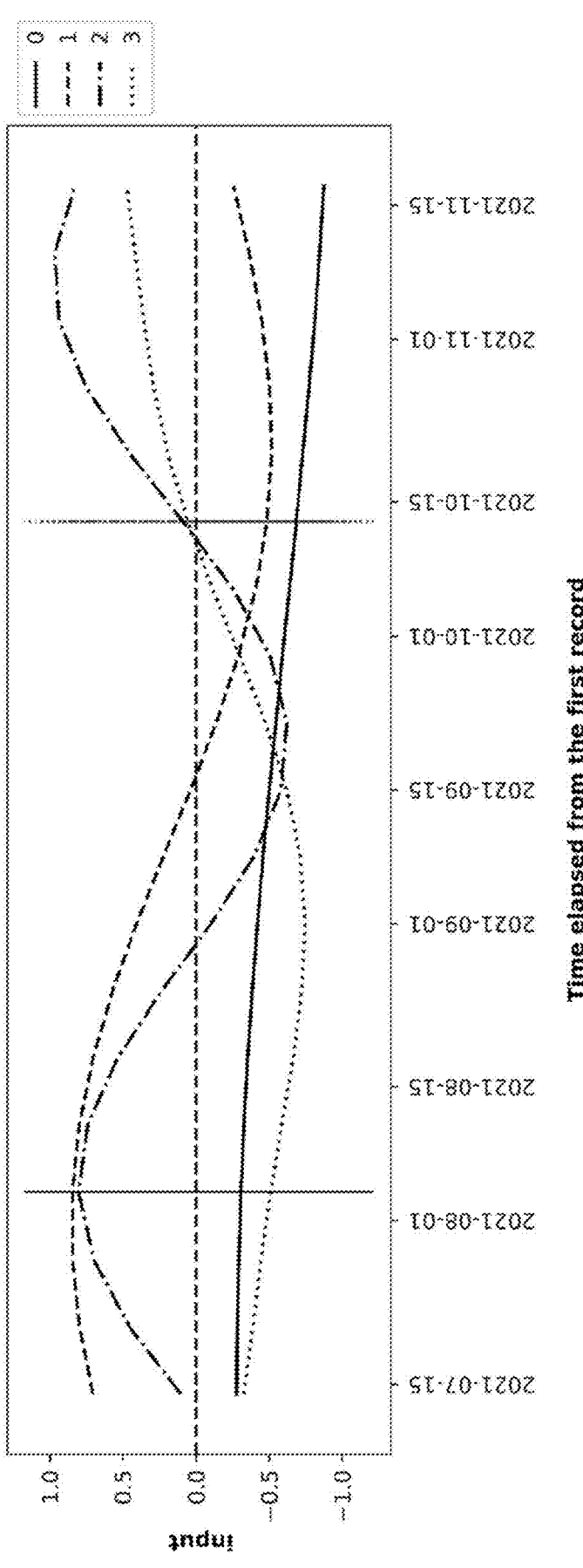
FIG. 5 shows a plot depicting downhill joint de-escalation trend assessment, as may be implemented in accordance with one or more embodiments.
Figure 6:
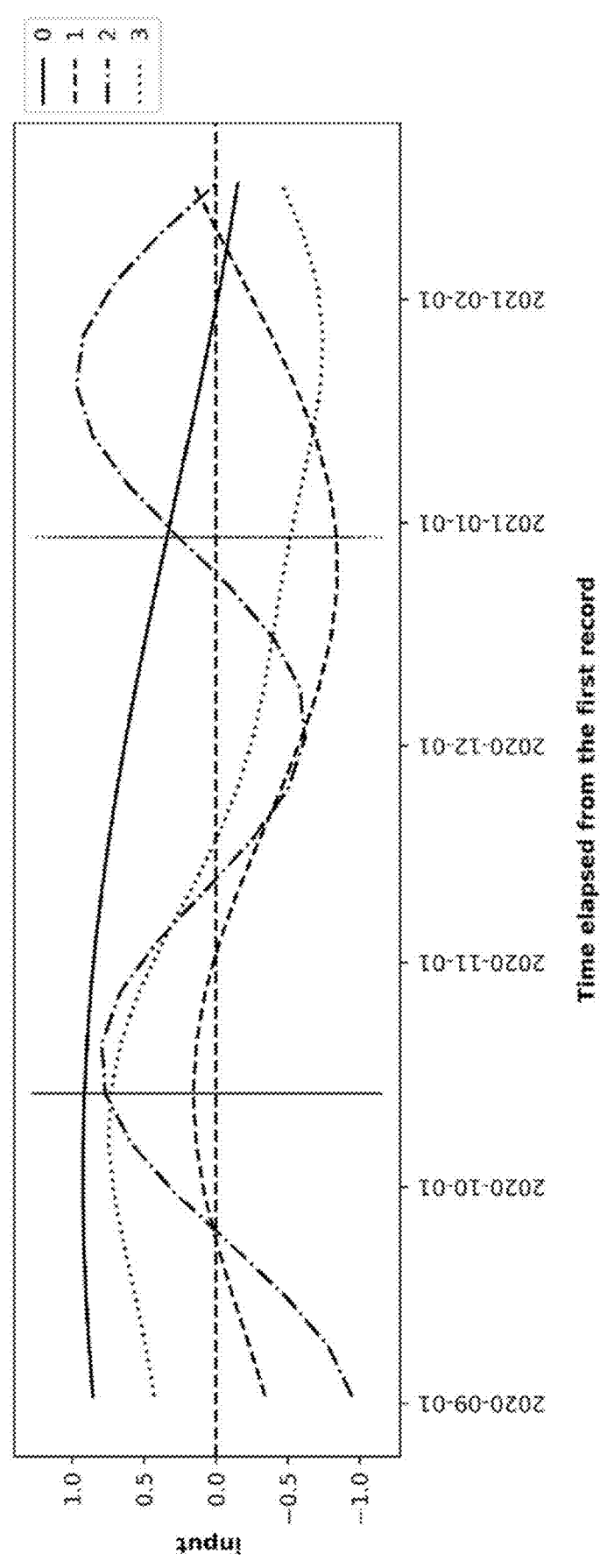
FIG. 6 shows a plot for assessing downhill joint de-escalation trend assessment, as may be implemented in accordance with one or more embodiments.

FIGS. 4-10 depict plots for visualization of the detection of uphill/downhill joint trends, with one or more segments illustrated (e.g., so there are options to choose from), specifically with FIGS. 4-6 depicting one segment of interest, and FIGS. 7-10 depicting several segments of interest. Each plot has an input or sign of slope on the Y-axis and elapsed time (from a first record) on the X-axis with dates shown as exemplary. The start of each window is depicted by a solid vertical line, and the end is depicted as a dashed vertical line. Various timeline segments indicate a trend type (escalation/de-escalation) jointly observable for identified sources. Inputs may correspond to trends (e.g., simulated for assessment) as characterized herein, generated by a number N=4 (0-3) independent sources, with each segment depicted respectively with solid or dashed plots as shown in each figure. Visualization parameters may include a type of trend sought (escalating="uphill"|de-escalating="downhill") and a contribution threshold to the overall trend direction, jointly coming from the most representative sources, per segment. Visualization outputs, per timeline segment, may include start and end time indexes between which a joint pattern is observable, and representative (most) sources involved in a snowball effect (e.g., sources which mostly contribute to observable in-segment trend direction).

FIG. 4 shows a plot depicting uphill joint escalation trend assessment, as may be implemented in accordance with one or more embodiments. In the time window from Jun. 23, 2021 to Aug. 4, 2021, there is an uphill trend, for example as possibly pulled by sources 1 (with weight 54.0 of the overall escalation tendency) and 2 (with weight 46.0 of the overall escalation tendency). This segment may be selected as the largest escalation segment (e.g. out of a total of 11), for all input time series (the largest in-segment sum of slopes for all sources, +1.12).

FIG. 5 shows a plot depicting downhill joint de-escalation trend assessment, as may be implemented in accordance with one or more embodiments. In the subsequent time window (relative to that depicted in FIG. 4) from Aug. 4, 2021 to Oct. 13, 2021, there is a significant downhill trend possibly pulled by sources 2 (with weight 58.7 of the overall de-escalation tendency) and 1 (with weight 41.3 of the overall de-escalation tendency). This is the second largest de-escalation segment (e.g., out of a total of 10), for all input time series (the second largest negative in-segment sum of slopes for all sources, −1.27).

FIG. 6 shows a plot for assessing downhill joint de-escalation trend assessment, as may be implemented in accordance with one or more embodiments. In a further time window (relative to FIG. 5), from Oct. 14, 2020 to Dec. 30, 2020, there is a significant downhill trend possibly pulled by sources 2 (with weight 38.2 of the overall de-escalation tendency), 3 (with weight 30.3 of the overall de-escalation tendency), and 0 (weight 27.1). This is the largest de-escalation segment (e.g., out of a total of 10), for all input time series (the largest negative in-segment sum of slopes for all sources, −1.65).

Figure 7:
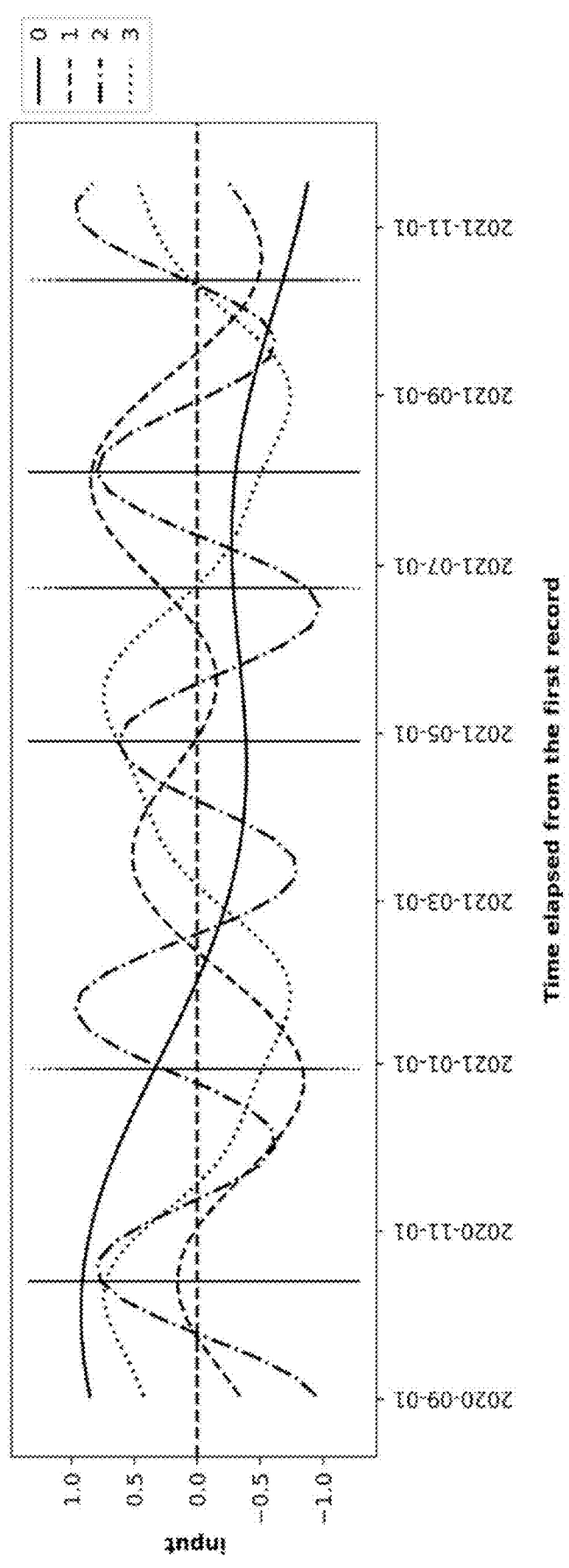
FIG. 7 shows a plot depicting downhill joint de-escalation trend assessment for three segments, as may be implemented in accordance with one or more embodiments.
Figure 8:
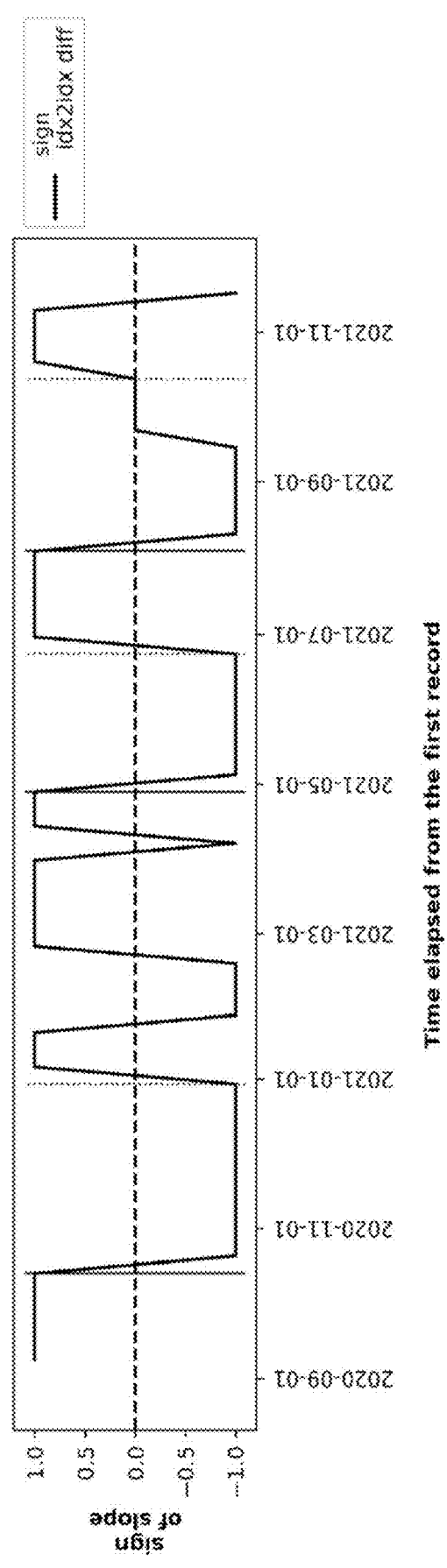
FIG. 8 shows a plot depicting the sign of slope for an input time series as depicted in FIG. 7, as may be implemented in accordance with one or more embodiments.

FIG. 7 shows a plot depicting downhill joint de-escalation trend assessment for three segments, as may be implemented in accordance with one or more embodiments. FIG. 8 shows a plot depicting the sign of slope for an input time series as depicted in FIG. 7, as may be implemented in accordance with one or more embodiments. Referring to the first segment in FIG. 7, from Oct. 14, 2020 to Dec. 30, 2020, there is a significant downhill trend possibly pulled by sources 2 (with weight 38.2 of the overall de-escalation tendency), 3 (with weight 30.3 of the overall de-escalation tendency), and 0 (weight 27.1). This is the largest de-escalation segment (e.g., out of a total of 10), for all input time series (the largest negative in-segment sum of slopes for all sources, −1.65). Slope (cumulative) values are −0.88 and −1.27 respectively for segments 2 and 3.

Figure 9:
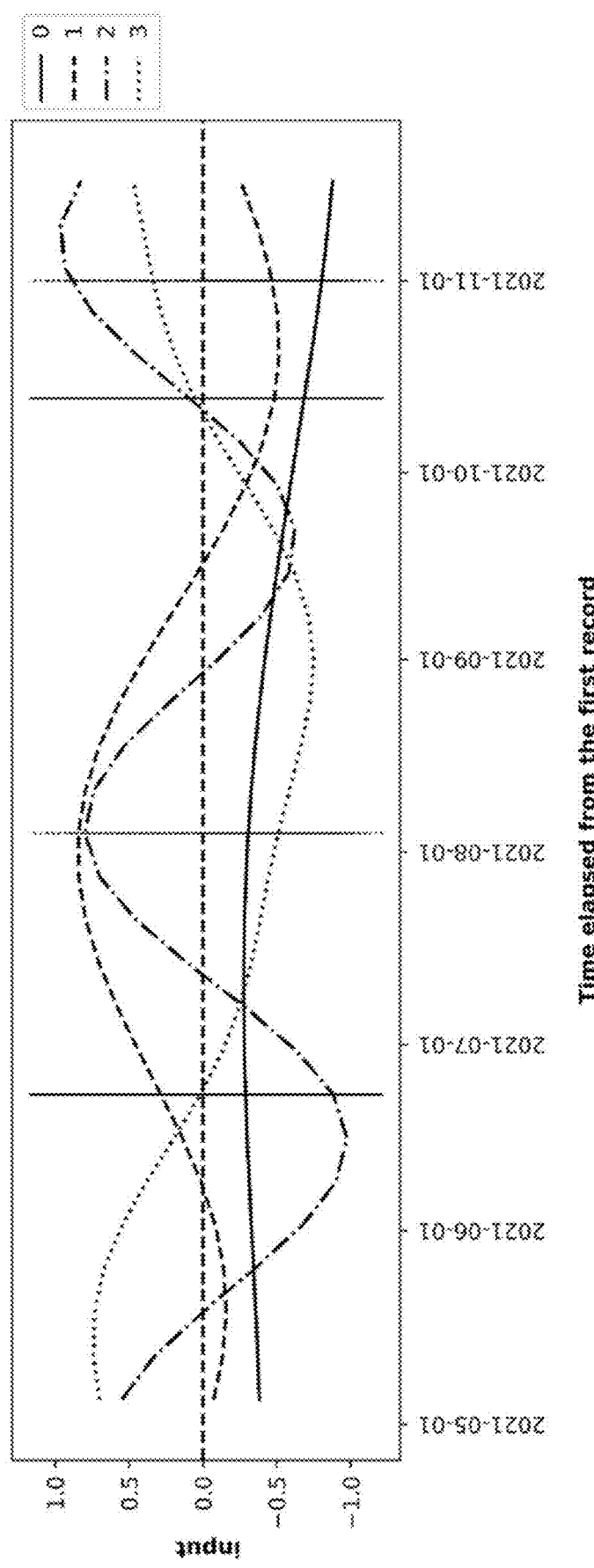
FIG. 9 shows a plot depicting uphill joint escalation trend assessment for two segments, as may be implemented in accordance with one or more embodiments.
Figure 10:
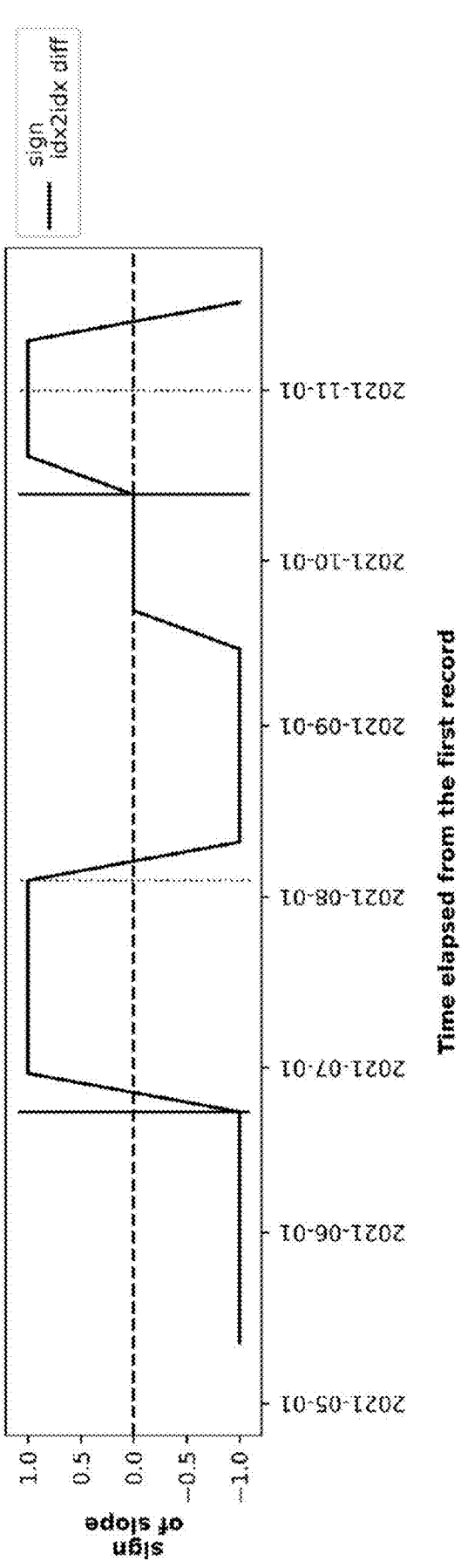
FIG. 10 shows a plot depicting the sign of slope for the input time series as depicted in FIG. 9, as may be implemented in accordance with one or more embodiments.

FIG. 9 shows a plot depicting uphill joint escalation trend assessment for two segments, as may be implemented in accordance with one or more embodiments. FIG. 10 shows a plot depicting the sign of slope for the input time series as depicted in FIG. 9, as may be implemented in accordance with one or more embodiments. Referring to segment 1 in FIG. 9, from Jun. 23, 2021 to Aug. 24, 2021, there is a significant uphill trend possibly pulled by sources 1 (with weight 54.0 of the overall escalation tendency) and 2 (with weight 46.0 of the overall escalation tendency). This is the largest escalation segment (out of a total of 11), for all input time series (the largest in-segment sum of slopes for all sources, +1.12). Referring to segment 2 in FIG. 9, from Oct. 13, 2021 to Nov. 1, 2021, there is a significant uphill trend possibly pulled by sources 2 (with weight 74.1 of the overall escalation tendency) and 3 (with weight 25.9 of the overall escalation tendency). This is the second largest escalation segment (e.g., out of a total of 11), for all input time series (the second largest in-segment sum of slopes for all sources, +0.89).

Figure 11:
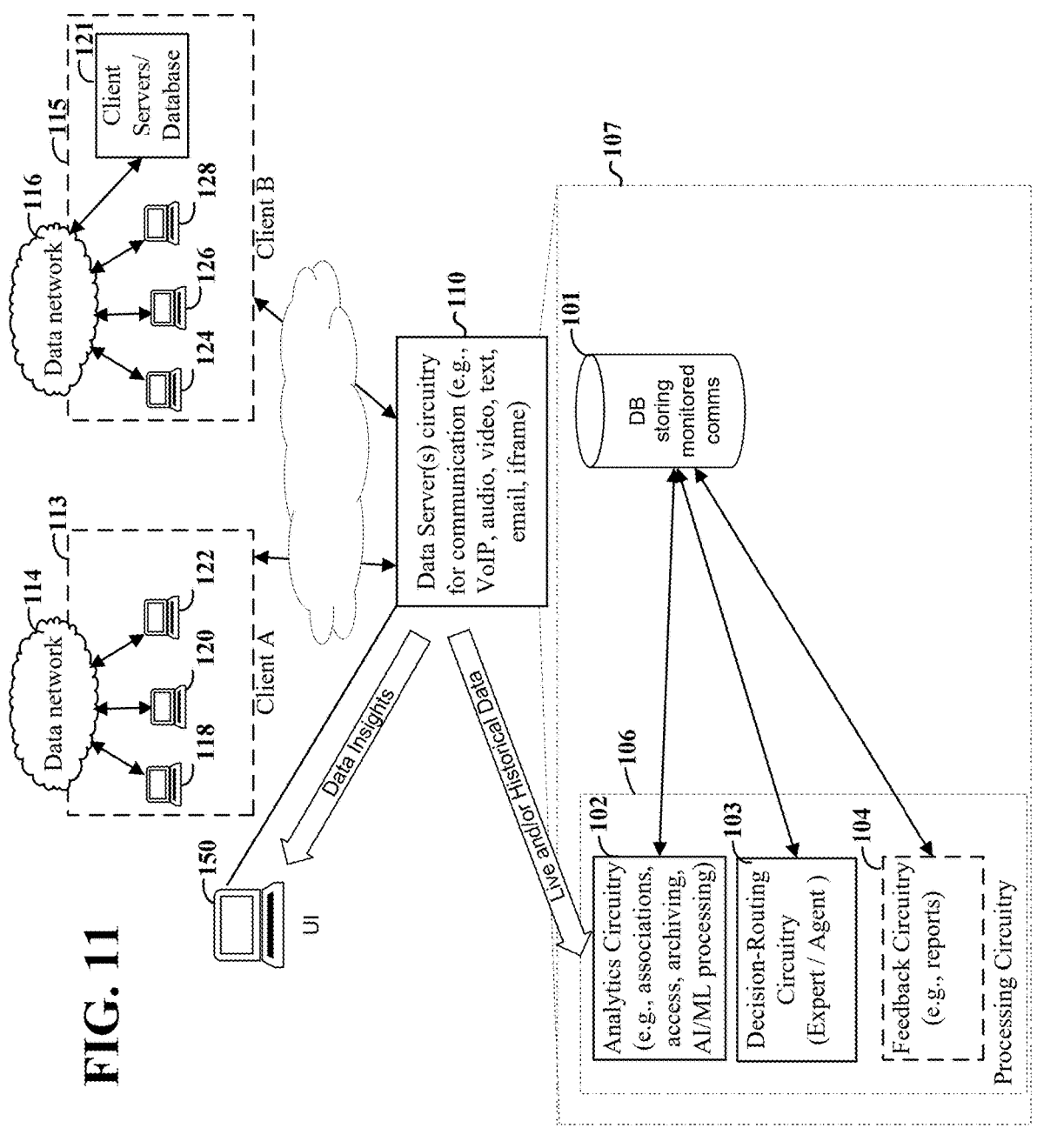
FIG. 11 shows a data-communications system, according to certain exemplary aspects of the present disclosure.

FIG. 11 shows a data-communications system, according to certain exemplary aspects of the present disclosure. The data-communications system includes a data-communications server 110 configured to provide data communication services, including data communications such as VoIP calls and other types of interactions (e.g., meetings involving text, chat, email, etc.), for a plurality of endpoint devices 118, 120, 122, 124, 126, 128 connected in one or more data networks 114, 116. The system includes processing circuitry 106 having various circuits (e.g., servers, software-directed aspects of CPU(s), logic circuitries, etc.) such as analytics circuitry 102 to analyze interactions for trending (e.g., as in FIG. 2 and/or in FIGS. 4-10) relative to content in database 101 and/or to AI/ML models. The processing circuitry may further include decision-routing circuitry 103 for deciding whether and/or how an incoming interaction should be routed, and in certain more specific examples or applications, also having feedback circuitry 104 as may be utilized to provide feedback to individual participants and/or supervisory type users (e.g., at user interface 150).

In specific embodiments, the data-communications server 110 may use the analytics circuitry 102 to analyze an incoming interaction by capturing and analyzing digital voice data from spoken conversations in connection with incoming interactions such as between agents of a client entity and customers. The spoken conversations may be transcribed from audio to digital voice data by the data-communications server 110, the endpoint device of the agent via a client on the endpoint device, and/or client data-communications server. The transcription of the spoken audio words to digital voice data can occur via a variety of methods. By discerning the contact information and/or other content (e.g., context of call and/or the transcription), the decision-routing circuitry 103 can access the information sets to check for associations and assessment of trend/snowball type effects relating to the communication.

In more specific embodiments, the data-communications server 110 includes an arrangement of coordinated servers such as one or more VoIP communications servers that provide VoIP communications and one or more other types of communications servers that provide other forms of data communications service(s). Although FIG. 11 illustrates two data networks 114, 116 communicatively coupled to the data-communications server 110, examples are not so limited and the data-communications server 110 can be communicatively coupled to three or more data networks, including as examples but not limited to broadband networks such as the Internet, cellular-telephony and/or satellite communications networks, etc. Such networks and communicatively-coupled endpoint devices are configured to communicate with one another (directly and/or indirectly) using data-communications circuits which may include wireless transceivers with user interfaces (graphic user interfaces, audible, etc.). For purposes of facilitating discussion, various specific embodiments are herein directed to methods and apparatuses that include the data-communications server 110 and processing circuitry 106 (or in a larger context, communications circuitry 107) in one or more of the above-noted variety of forms. Although the processing circuitry 106 and communications circuitry 107 are illustrated as a component of the data-communications server 110, embodiments are not so limited and these components can form part of or be separate from the data-communications server 110.

The endpoint devices are circuit-based instruments that may be used by personnel (or users) and include data communications-enabled circuitry, such as VOIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device may be respectively associated with an account of a respective client. Endpoint devices can be associated with a particular client account by registering the endpoint device with a particular client account serviced by the data-communications server 110. Registered devices for each client account can be listed in a respective account settings file stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110, in accordance with aspects of the present disclosure. One or more of the clients can have client servers and/or databases 121 used to implement a variety of different services.

Accordingly, the endpoint devices may include data-communications circuits that may be remotely located relative to the data-communications server 110 and may be respectively associated with remotely situated client entities. In certain but not all embodiments, the data-communications system may include the remotely-located data-communications circuits, and in some instances one or more of the endpoint devices correspond to and/or includes a computer or a smartphone (e.g., mobile phone or tablet) to function as a softphone by running application software; and/or a computer or a smartphone to operate natively within a web browser (e.g., using webRTC) and in turn the web browser is to run on a computer or a smartphone.

In one specific example, the form of the system shown in FIG. 11 includes the data-communications server 110 configured to host one or more of XCaaS, UCaaS CCaaS, CPaaS environments, products and services. Such services may pertain to the 8×8 Work system as characterize above, or to other systems as characterized herein. The platform is integrated with a memory (database) circuit 101. The memory circuit may include a database having a plurality or a plethora of information sets. Each of the information sets may include user/client-entity identity information and historical information pertaining to escalation/de-escalation (or neutral) meeting sentiment type values. The platform may regularly access the database to assess the incoming interactions and may use past incoming interactions along with information collected via other data sources (e.g., internal to the system such as AI/ML modeled data and/or third party information). By analyzing communications, the platform is able to facilitate an automated approach to identifying slope-based escalation or de-escalation scenarios for various communications, provide insight as to such scenarios, and in some implementations, provide outputs to specific users (or their supervisors) causing or being affected by escalation and/or de-escalation trends.

In various embodiments, the data-communications system can also track a variety of information, parameters and/or metrics related to communications (i.e., incoming interactions) made or received by participants in meetings hosted by the data-communications server 110. The parameters can include information related to escalation/de-escalation as characterized herein, and others such as average communication duration, identification of issues and troubleshooting, resolution, professionalism, and other metrics. The parameters can be scored (e.g., percentage or other value scored) to rate a particular participant on each particular call and to form a metric used to assess the participant. The parameters and/or metrics can be used to determine or predict changes in sentiment for a particular meeting.

In a number of embodiments, a particular client can customize the metrics and/or data insights that are to be tracked such as by the server 110 of FIG. 11. Such customization can include the type of metrics, values given, and/or particular phrases or statements for complying with the metric (e.g., a specific call opening). For example, the customization can include definitions of performance expectations and scores, as well as performance thresholds for various metrics. This may pertain to a particular user's effects upon sentiment for disparate communication sessions over time.

In a number of specific embodiments, tone or sentiment can be compared to one or more thresholds. For example, the processing circuitry 106 can identify a trend parameter that is outside of a threshold value (e.g., indicating an issue or potential problem), and which can correspond to or be indicative of a tone or sentiment of the conversation. This may be carried out via the analytics circuitry 102, using the provider-side database 101. As a specific example, audio above a particular amplitude and velocity can be indicative of a customer or agent who is upset or otherwise agitated, and provide an indication of meeting sentiment. The thresholds can include generic thresholds (anything above a particular value), thresholds that are specific to geographic regions or types of customers, and/or baseline values of the specific speaker or agent.

The skilled artisan would also recognize various terminology as used in the present disclosure by way of their plain meaning. As examples, the Specification may describe and/or illustrate aspects useful for implementing the examples by way of various circuits that may be illustrated as or using terms such as block, module, device, system, unit, controller, and/or other circuit-type depiction. Such components and circuit elements and/or related circuitry may be used together with other elements to exemplify how certain examples may be carried out in the form or structures, steps, functions, operations, activities, etc. It would also be appreciated that terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed:

1. A computer-implemented method comprising:

hosting a meeting in a data-communications system during which a plurality of participants communicate with each other via a respective ones of a plurality of endpoint devices, such that the plurality of endpoint devices generates a plurality of signals respectively indicative of respective communications made by the plurality of participants during the meeting;

monitoring the plurality of signals;

deriving a plurality of time series of user-level categorical variable data respectively from the monitored plurality of signals, the plurality of time series of user-level categorical variable data respectively indicating sentiments of respective ones of the plurality of participants during the meeting;

determining multiple slope segments of each of the plurality of time series of user-level categorical variable data, the respective multiple slope segments being indicative of a respective user-level trend in the respective sentiment of each of the respective plurality of participants during the meeting;

analyzing the determined multiple slope segments of each of the plurality of time series of user-level categorical variable data to identify one of the plurality of time series of user-level categorical variable data having a change in the user-level trend in the sentiment of a respective one of the plurality of participants during the meeting; and generating and transmitting an output to an endpoint device identifying the change in the user-level trend in the sentiment of the respective participant during the meeting.

2. The method of claim 1, wherein generating and transmitting the output to the endpoint device comprises presenting a graphical indication of the change in the user-level trend for display on the endpoint device.

3. The method of claim 1, wherein the meeting is a videoconference, and wherein the plurality of signals are video signals.

4. The method of claim 1, further comprising controlling subsequent communications between the plurality of participants in response to generating and transmitting an output to the endpoint device.

5. The method of claim 1, wherein the determined multiple slope segments of each of the plurality of time series of user-level categorical variable data are indicative of a rate of change in the user-level trend in the sentiment of each of the plurality of participants during the meeting, wherein the identified time series of user-level categorical variable data has a rate of change in the user-level trend greater than a threshold, and wherein the output to the endpoint device identifies the rate of change in the user-level trend in the sentiment of the respective participant.

6. The method of claim 1, wherein the output identifies the endpoint device that generated the time series of the respective one of the plurality of signals from which the identified time series of time series of user-level categorical variable data was derived.

7. The method of claim 1, wherein the determined multiple slope segments of each of the plurality of time series of user-level categorical variable data is analyzed to identify the one of the plurality of time series of user-level categorical variable data having a change in the user-level trend in the sentiment of the respective participant during the meeting greater than a change in user-level trends in the sentiment of others of the plurality of participants during the meeting.

8. The method of claim 1, further comprising transforming a summation of the slope segments of each of the plurality of time series of user-level categorical variable data into a time series of summed slope values, wherein the output to the endpoint device identifies the time series of summed slope values.

9. The method of claim 1, wherein each of the determined multiple slope segments of each of the plurality of time series of user-level categorical data indicates either a positively increasing sentiment or a negatively increasing sentiment of each of the respective plurality of participants during the meeting.

10. The method of claim 1, further comprising:

deriving a time series of meeting-level categorical variable data from the monitored plurality of signals, the time series of meeting-level categorical variable data indicating a sentiment of the meeting;

wherein the plurality of time series of user-level categorical variable data is respectively a plurality of time series of user-level categorical variable data respectively correlated to the time series of meeting-level categorical variable data;

wherein the determined multiple slope segments of each of the plurality of time series of user-level categorical variable data is indicative of a correlated user-level trend in the sentiment of each of the respective plurality of participants during the meeting;

wherein the identified one of the plurality of time series of correlated user-level categorical variable data has a change in the correlated user-level trend in the sentiment of the respective participant during the meeting; and wherein the output to the endpoint device identifies the change in the correlated user-level trend in the sentiment of the respective participant during the meeting.

11. The method of claim 10, further comprising:

transforming a summation of the determined multiple slope segments of each of the plurality of time series of user-level categorical variable data into a time series of summed slope values; and identifying locations of transitions between a sign of the time series of correlated summed slope values;

wherein the output to the endpoint device further identifies the locations of the transitions.

12. A data communications system, comprising:

server circuitry configured for hosting a meeting in a data-communications system during which a plurality of participants communicate with each other via a respective ones of a plurality of endpoint devices, such that the plurality of endpoint devices generates a plurality of signals respectively indicative of respective communications made by the plurality of participants during the meeting; and analytics circuitry configured for:

monitoring the plurality of signals;

deriving a plurality of time series of user-level categorical variable data respectively from the monitored plurality of signals, the plurality of time series of user-level categorical variable data respectively indicating sentiments of respective ones of the plurality of participants during the meeting;

determining multiple slope segments of each of the plurality of time series of user-level categorical variable data, the respective multiple slope segments being indicative of a respective user-level trend in the respective sentiment of each of the respective plurality of participants during the meeting;

analyzing the determined multiple slope segments of each of the plurality of time series of user-level categorical variable data to identify one of the plurality of time series of user-level categorical variable data having a change in the user-level trend in the sentiment of a respective one of the plurality of participants during the meeting; and generating and transmitting an output to an endpoint device identifying the change in the user-level trend in the sentiment of the respective participant during the meeting.

13. The data communications system of claim 12, wherein the analytics circuitry is further configured for transforming a summation of the determined multiple slope segments of each of the plurality of time series of user-level categorical variable data into a time series of summed slope values, wherein the output to the endpoint device identifies the time series of summed slope values.

14. The data communications system of claim 12, wherein each of the determined multiple slope segments of each of the plurality of time series of user-level categorical data indicates either a positively increasing sentiment or a negatively increasing sentiment of each of the respective plurality of participants during the meeting.

15. The data communications system of claim 12, wherein the analytics circuitry is further configured for deriving a time series of meeting-level categorical variable data from the monitored plurality of signals, the time series of meeting-level categorical variable data indicating a sentiment of the meeting;

wherein the plurality of time series of user-level categorical variable data is a plurality of time series of user-level categorical variable data correlated to the time series of meeting-level categorical variable data;

wherein the determined multiple slope segments of each of the plurality of time series of user-level categorical variable data is indicative of a correlated user-level trend in the sentiment of each of the respective plurality of participants during the meeting;

wherein the identified one of the plurality of time series of correlated user-level categorical variable data has a change in the correlated user-level trend in the sentiment of the respective participant during the meeting; and wherein the output to the endpoint device identifies the change in the correlated user-level trend in the sentiment of the respective participant during the meeting.

16. The data communications system of claim 12, wherein the analytics circuitry is further configured for:

transforming a summation of the determined multiple slope segments of each of the plurality of time series of user-level categorical variable data into a time series of summed slope values; and identifying locations of transitions between a sign of the time series of correlated summed slope values;

wherein the output to the endpoint device further identifies the locations of the transitions.

17. A non-transitory computer-readable storage medium comprising instructions stored thereon, which when executed by one or more processors, cause the one or more processors to perform operations for managing a meeting in a data-communications system during which a participant communicates with other participants via an endpoint device, such that the endpoint device generates a signal indicative of communications made by the participant during the meeting, the operations comprising:

monitoring the signal;

deriving a time series of user-level categorical variable data from the monitored signal, the time series of user-level categorical variable data indicating a sentiment of the participant during the meeting;

determining multiple slope segments of the time series of user-level categorical variable data, the multiple slope segments being indicative of a user-level trend in the sentiment of each of the respective plurality of participants during the meeting;

analyzing the determined multiple slope segments of the time series of user-level categorical variable data to identify a change in the user-level trend in the sentiment of the participant during the meeting; and generating and transmitting an output to an endpoint device identifying the change in the user-level trend in the sentiment of the participant during the meeting.

18. The non-transitory computer readable storage medium of claim 17, further comprising controlling subsequent communications from the participant in response to generating and transmitting an output to the endpoint device.

19. The non-transitory computer-readable storage medium of claim 17, wherein each of the determined multiple slope segments of the time series of user-level categorical data indicates either a positively increasing sentiment or a negatively increasing sentiment of the participant during the meeting.

20. The non-transitory computer-readable storage medium of claim 17, wherein the operations further comprise:

monitoring a plurality of signals respectively generated by a plurality of endpoint devices during the meeting, the plurality of signals indicative of respective communications made by a plurality of participants during the meeting;

deriving a time series of meeting-level categorical variable data from the monitored plurality of signals, the time series of meeting-level categorical variable data indicating a sentiment of the meeting;

wherein the time series of user-level categorical variable data is a time series of user-level categorical variable data correlated to the time series of meeting-level categorical variable data;

wherein the determined multiple slope segments of the time series of user-level categorical variable data is indicative of a correlated user-level trend in the sentiment of the participant during the meeting;

wherein the identified change in the user-level trend in the sentiment of the participant during the meeting is a change in the correlated user-level trend in the sentiment of the participant during the meeting; and wherein the output to the endpoint device identifies the change in the correlated user-level trend in the sentiment of the participant during the meeting.

* * * * *